United States Patent [19]

Monroe et al.

[11] 4,238,876
[45] Dec. 16, 1980

[54] METHOD FOR CONVERTING HARD TOP VEHICLES TO REMOVABLE TOP VEHICLES

[75] Inventors: Gary S. Monroe, Encino; Robert L. Contreras, both of 21601 Erwin St. #285, Woodland Hills, Calif. 91367; Gregory C. Hummel, 1832 N. Naomi, Burbank, Calif. 91505

[73] Assignees: Gary S. Monroe; Robert L. Contreras; Gregory C. Hummel; Barry A. Russell, all of Los Angeles, Calif.

[21] Appl. No.: 939,230

[22] Filed: Sep. 5, 1978

[51] Int. Cl.³ .................. B22D 19/10; B23P 7/00
[52] U.S. Cl. ................... 29/401.1; 29/416; 29/451; 29/426.2; 29/460; 33/18 R; 296/224
[58] Field of Search ........... 29/460, 416, 428, 451, 29/401 B, DIG. 34, 401.1; 296/137 B, 137 R; 277/178, 200, 214, 215; 220/358; 33/21 C

[56] References Cited

U.S. PATENT DOCUMENTS

| | | | |
|---|---|---|---|
| 1,535,980 | 4/1925 | Campbell et al. | 33/21 C UX |
| 1,683,953 | 9/1928 | Carr | 33/21 C UX |
| 2,430,873 | 11/1947 | Haas | 29/DIG. 34 UX |
| 2,816,794 | 12/1957 | Temp | 29/401 B |
| 3,053,562 | 9/1962 | Farber | 296/137 B X |
| 3,540,113 | 11/1970 | Krutzikowsky | 29/416 X |
| 3,552,341 | 1/1971 | Lannin | 29/416 X |
| 3,610,681 | 10/1971 | Trenkler | 296/137 R |
| 3,674,359 | 7/1972 | Crowe | 29/416 X |
| 3,713,687 | 1/1973 | Hooks et al. | 296/137 B X |
| 3,965,566 | 6/1976 | Green | 29/451 |
| 4,113,303 | 9/1978 | Yench | 296/137 B |
| 4,138,155 | 2/1979 | Chrysler | 296/137 B |

*Primary Examiner*—Charlie T. Moon
*Attorney, Agent, or Firm*—Charles D. Brown

[57] ABSTRACT

A procedure is disclosed whereby a vehicle which has been manufactured with a top which is of unitary construction with the body of the vehicle may be converted to a vehicle having a removable top. Also disclosed are sealing and mounting devices for securing and sealing the removable top to the body of the vehicle.

5 Claims, 15 Drawing Figures

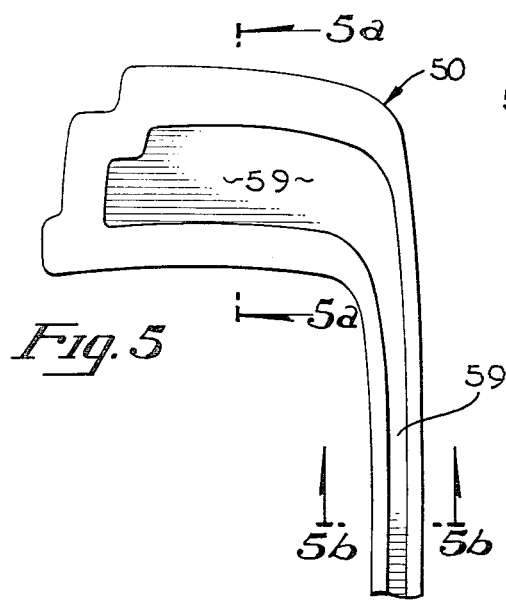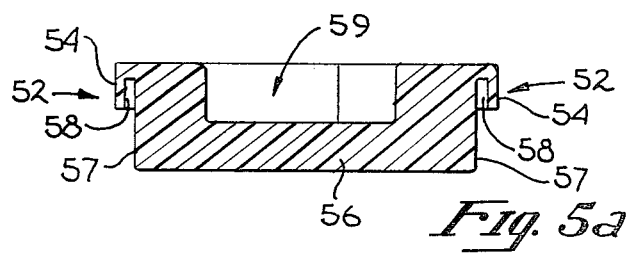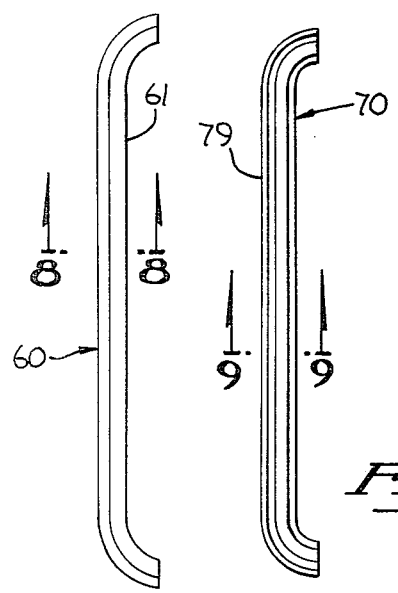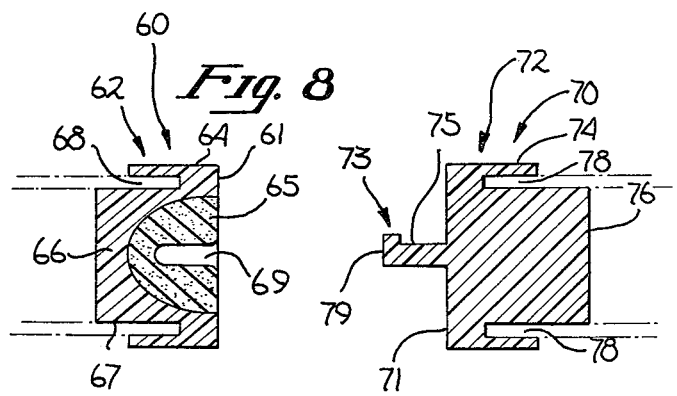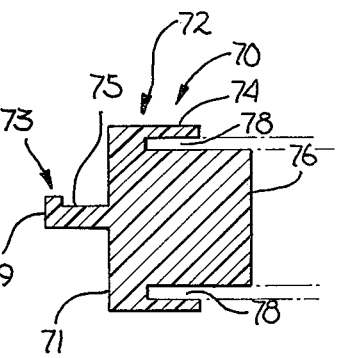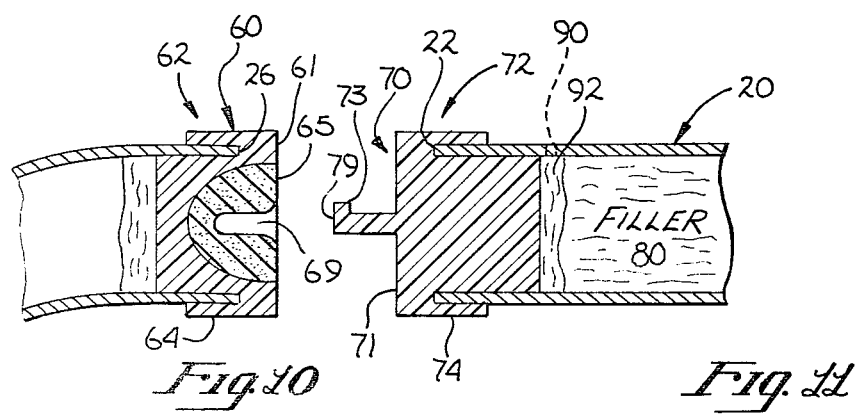

METHOD FOR CONVERTING HARD TOP VEHICLES TO REMOVABLE TOP VEHICLES

BACKGROUND OF THE INVENTION

1. Field of the Invention

The invention disclosed herein relates generally to the art of converting hardtop vehicles to removable top vehicles and is closely related to the vehicle customizing field. More specifically this invention relates to the art of severing a double walled steel structure and adapting the severed edges to be removably rejoined.

2. Prior Art

A relatively recent development in the automobile and recreational sport pickup truck field is the trend to removable hardtops. Since soft top convertibles are no longer production manufactured in the United States, removable hardtops have become very popular. Generally such removable tops are made of fiberglass. However, fiberglass has certain disadvantages as compared to sheet metal, such as less strength and durability. Consumers have shown a definite preference for removable tops made of steel, where this is a practical approach.

The approach presently used to convert a hardtop vehicle to a removable hardtop requires the use of many screws to fasten the mating gaskets to the opposed severed edges. The tightening of the screws draws the sheet metal into firm contact with the gaskets and also places much stress in the sheet metal and may induce warping of the metal, resulting in cracking of the paint, thus often requiring a complete new paint job. The procedure also calls for the drilling of many holes along the severed edges to accept the sheet metal screws. This requires a significant amount of labor and time. Each screw must then be tightened requiring additional time. This procedure often requires a vehicle to spend several days in the shop to complete the repainting, and other tasks, and with the increasing variety of paints used on the various types of vehicle typically so modified, it is often difficult to match the new paint to the old paint, so many times an entirely new coat of paint is applied to the vehicle.

It is thus an object of the present invention to provide a method of severing the top of a vehicle from its body and adapting the top and body to be removably rejoined which method does not require repainting of any portion of the vehicle and does not use screws to secure the mating gaskets to the severed sheet metal.

It is a further object of this invention to provide a method of converting a hard top vehicle into a removable top vehicle which removable top is actually the original hardtop of the vehicle slightly modified.

It is another object of this invention to provide mating gaskets which can easily and quickly be installed on the severed edges of the body and top to permit removable rejoining of the body and top.

It is yet another object of this invention to provide a method of securing the mating gaskets to the severed edges which provides for substantial structural strength and integrity along the rejoined portions of the body and top.

It is again an object of this invention to provide a standard gasket insert which can be used in production line fashion on all vehicles of a particular model.

An additional object of this invention is to provide a method of quickly and accurately severing the top from a particular model vehicle in exactly the same place on each vehicle.

The invention also provides for a means to prohibit fluids which may enter between the mating gaskets from entering the interior of the vehicle.

SUMMARY OF THE INVENTION

The invention comprises a method, which employs specifically designed scribing molds and specifically designed and unique sealing gaskets, for converting a hardtop vehicle into a removable top vehicle. As described herein the invention has particular application to the cab of a pickup truck, however the invention is not intended to be limited to a pickup truck and is applicable to most any hardtop vehicle. The scribing molds are formed to match the contour of the body of the truck at preselected locations. Specifically, four such scribing molds are used to precisely scribe cutting lines onto the body of the truck. In addition, two pairs of preformed mating gaskets are affixed to the severed edges of the truck body and top. The gaskets are provided with lips to retain the cut edges of the truck body and are designed for easy and quick installation.

The inventive method calls for the use of preformed scribing molds to precisely locate four cutting lines, two of which are approximately three inches above the front window one on the exterior of the cab and one on the interior of the cab, the other two being approximately three inches below the rear window, one on the exterior and one on the interior of the cab. Once the cutting lines have been scribed along the edge of the molds, the incisions are made and the cab top is removed. A one half inch strip is then trimmed from each cut edge of the removed top in order to make room for the two mating pairs of gaskets between the top and body.

When the trimming is completed all cavities on the top and body, exposed as a result of the cutting, are filled with a filler foam to within approximately two inches of the cut edges. A bonding agent is then applied to all surfaces of the gasket inserts which will contact the top or the cab and the gasket inserts are then tapped into the severed sections of the top and cab. To insure proper fit and alignment the top is then joined to the cab and appropriate positional adjustments made to the mating insert gaskets.

A quick set glue and foam is injected immediately behind the insert gaskets and the gaskets are thereby permanently bonded to the cab and top.

BRIEF DESCRIPTION OF THE DRAWINGS

FIG. 5 is a plan view of the gasket which fits onto the rear severed portion of the body.

FIG. 5a is a cross-section taken along the line 5a—5a of FIG. 5.

FIG. 5b is a cross-section taken along the line 5b—5b of FIG. 5.

FIG. 6 is a plan view of the gasket which fits onto the forward severed portion of the cab body.

FIG. 7 is a plan view of the gasket which fits onto the forward severed portion of the removed roof.

FIG. 8 is a cross section of the gasket shown in FIG. 6 taken along the line 8—8.

FIG. 9 is a cross-section of the gasket shown in FIG. 7 taken along the line 9—9.

FIG. 10 is a cross-section of the gasket of FIG. 6 as it appears when mounted on the forward severed portion of the cab body.

FIG. 11 is a cross section of the gasket of FIG. 7 as it appears when mounted on the forward severed portion of the severed roof.

DETAILED DESCRIPTION OF THE PREFERRED EMBODIMENT

The present invention comprises a method for severing the roof of the cab of a pickup truck from the body of the pickup truck and adapting that severed roof portion to be removably rejoined to the remaining structure of the pickup truck. The method also employs devices referred to as gaskets the structure of which is also disclosed herein. The purpose for employing the method and devices of the present invention is to effect a separation of a portion of the roof of the cab of the truck from the body of the truck and to insert in the severed roof portion the male halves of two sets of mating gaskets. The female halves of the respective mated pairs of gaskets are installed on the corresponding severed portions of the body of the truck. When installation of the gaskets is completed the roof portion may then be joined to the body portion by insertion of the male portions of the gaskets into the female portions of the gaskets. Once the severed roof portion is thus rejoined to the body portion of the pickup truck it is latched in place by four suitably placed latches on the interior of the cab. With this purpose in mind a reference to FIG. 1 will facilitate an understanding of the invention.

Figure 1:
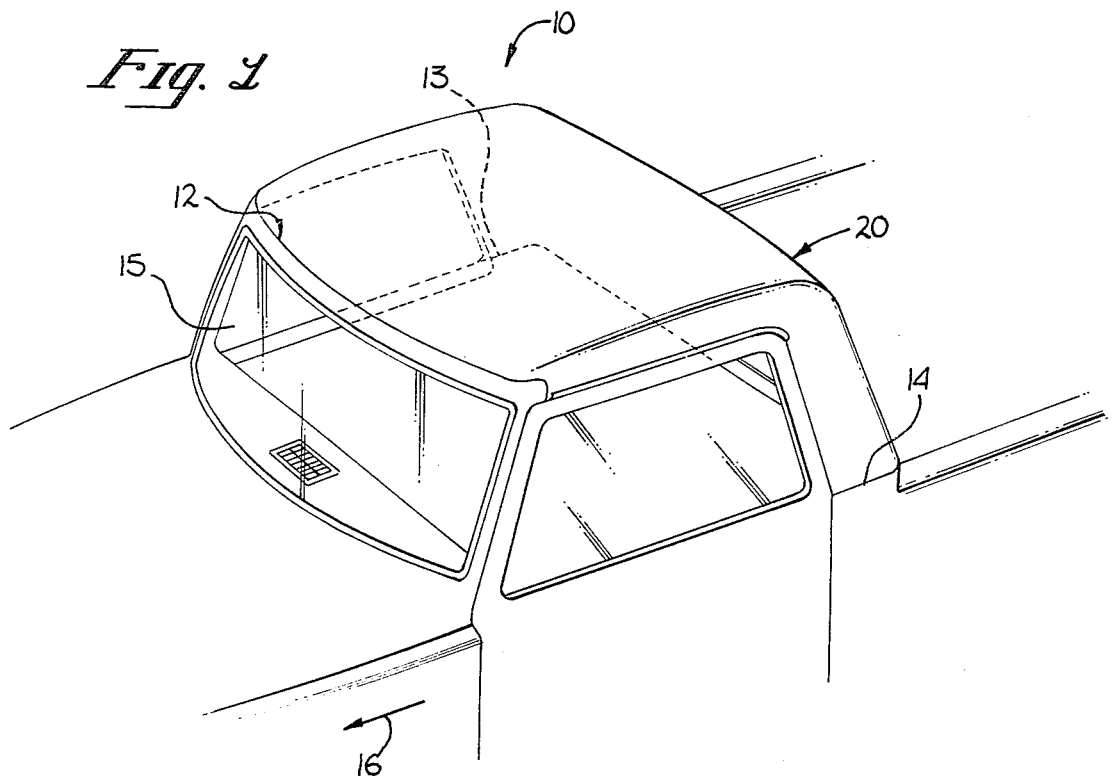
FIG. 1 is a perspective view of a typical cab section of a pickup truck.
Figure 2:
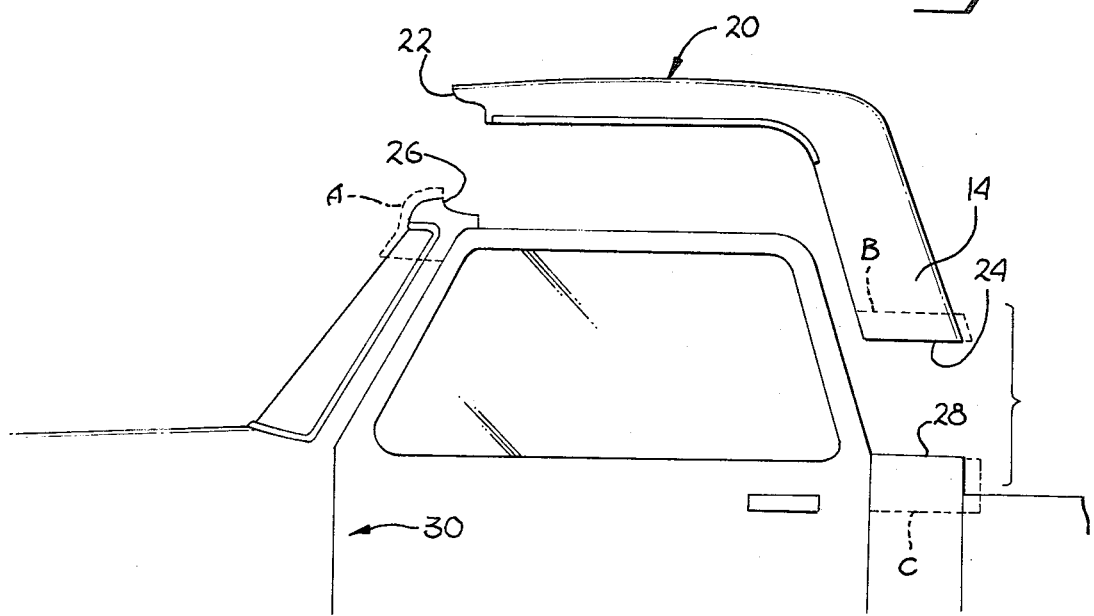
FIG. 2 is a side view of the cab section illustrating that portion of the cab top which is converted to a removable top.

FIG. 1 shows the cab section 10 of a pickup truck body. On the cab section have been scribed lines 12, 13 and 14. These lines are located by means of a preformed scribing mold. Each line being located by a separate scribing mold. These scribing molds are indicated by the typical molds A, B, and C in FIG. 2. These molds are contoured so that they seat themselves in a predetermined location on the body of the truck. In this manner by properly seating the scribing mold a line can be scribed on the body of the truck in a precise location by following the scribing edge of the scribing mold. The use of such scribing molds permits the scribing lines to be located precisely in the same location from one truck to the next in a repeatable fashion for a given model of truck. It is desired that the scribing line 12 be located approximately three inches above the front window numbered 15 in FIG. 1. A similar scribing line is located opposite scribing line 12 on the interior of the cab. A scribing mold is also used to locate scribing line 14 and scribing line 13 shown in FIG. 1 which are located approximately three inches below the bottom of the rear window. For purposes of reference the arrow 16 in FIG. 1 will be used to indicate the forward direction in FIG. 1 and in the remainder of this disclosure. Once the scribing lines 12, 13 and 14 and the scribing line opposite 12 on the interior of the cab have all been located, incisions are made along these lines thereby severing the roof of the cab 20 from the body 30 of the truck as shown in FIG. 2. This separation produces a forward severed edge 22 and a rearward severed edge 24 on the roof member 20, and also produces a forward severed edge 26 and a rearward severed portion 28 on the truck body member 30.

Figure 3:
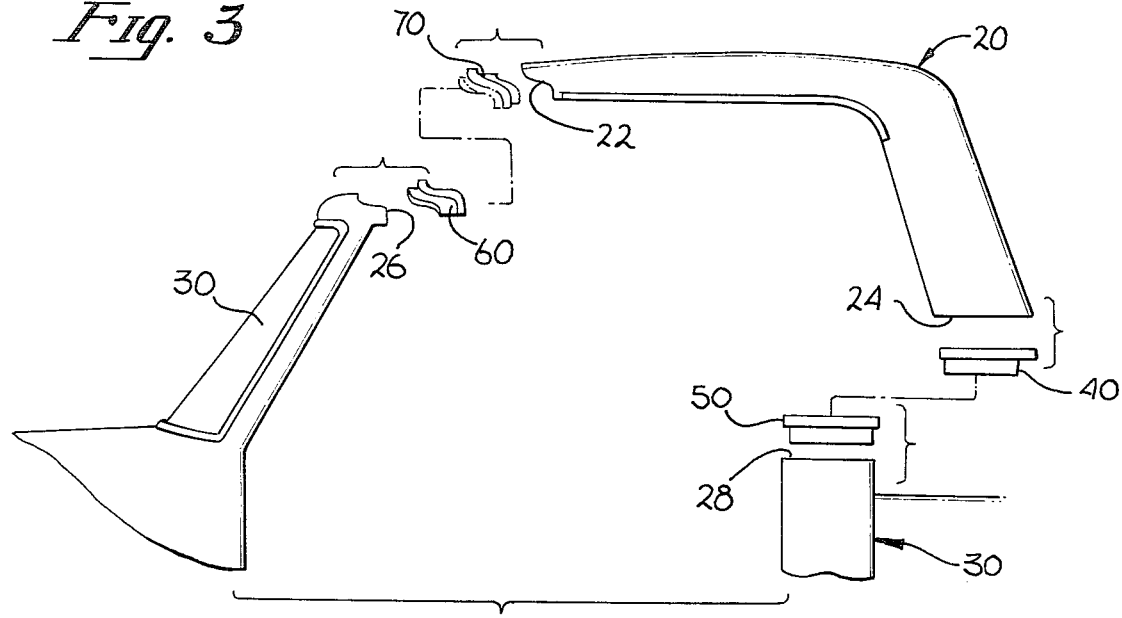
FIG. 3 is an exploded side view of the removable top illustrating the placement of the various gaskets.

The placement of the various gaskets previously referred to is illustrated in FIG. 3. FIG. 3 is a side view employed not for the purpose of showing any detail but rather merely to illustrate the positional relationship of the truck body, the four gasket members and the roof of the cab. Gasket member 40 fits over the rearward severed portion 24 of roof 20. Female gasket member 50 fits over the rearward severed portion 28 of the body 30. Gasket 60 fits over the forward severed portion of the body 30, and male gasket 70 fits over the forward severed portion 22 of roof 20. Each of these gasket members is secured by suitable glue means to the respective severed edges. As can be readily visualized once the gasket members are securely located on their respective severed edge portions, roof member 20 can be removably affixed to the body 30 by insertion of the male gasket portions into the female gasket portions. Each of the respective gasket portions 40, 50, 60 and 70 are described in greater detail below.

Figure 4:
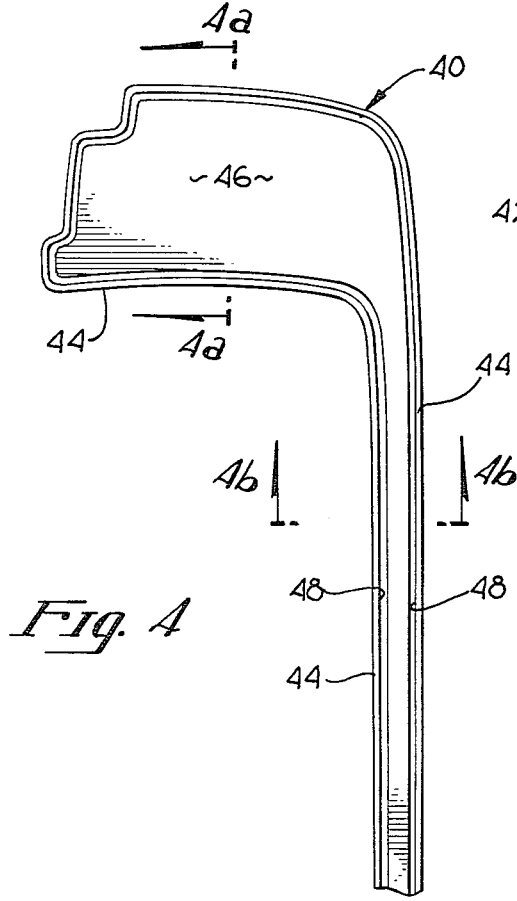
FIG. 4 is a plan view of a portion of the gasket which fits onto the rear severed portion of the roof.
Figure 4A:
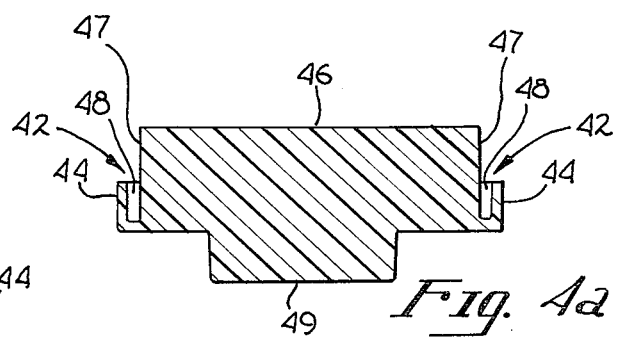
FIG. 4a is a cross-section taken along the line 4a—4a of FIG. 4.
Figure 4B:
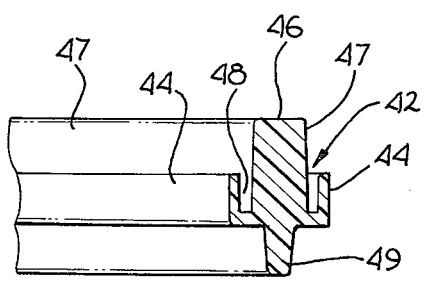
FIG. 4b is a cross-section taken along the line 4b—4b of FIG. 4.

FIG. 4 illustrates the gasket which fits over the rearward severed portion of the roof. This gasket member is designated generally as 40. As shown in FIG. 4a this gasket member 40 has a lip structure 42 which is designed to fit over the double walls of the roof structure. This lip structure comprises a wall 44 which in combination with the body 46 defines a channel 48 which runs around the entire perimeter of member 40. The gasket 40 is inserted onto the rearward severed portion of the roof by insertion of the body 46 into the cavity located between the double walls of the roof such that each of the walls of the roof are seated in the channel 48. Prior to such insertion a suitable glue has been spread on the surfaces 47 and into the channels 48. The surfaces 47 and the surfaces of the channel 48 are those surfaces which come in contact with the surfaces of the double walls of the severed portion of the roof, and it is by means of this glue that the gasket member 40 is secured in place on the roof 20. FIG. 4b is also a cross-sectional view of gasket member 40, but taken at a different location. It should be noted that gasket member 40 has a protrusion 49 which serves to seat and align gasket member 40 with gasket member 50.

FIG. 5 illustrates gasket member 50 which is the gasket member which fits over the rearward severed portion of the cab body. It should be noted that the general shape of gasket member 50 conforms to the general shape of gasket member 40 and the two form a mating pair. Corresponding to the cross-sectional view of gasket member 40 illustrated in FIG. 4a, there is shown in FIG. 5a a similar cross-sectional view of gasket member 50. Gasket member 50 also has a lip structure 52 comprised of a wall member 54 which in combination with the body portion 56 defines a channel 58. Body portion 56 also has side walls 57, and it is in the channels 58 and on the side wall 57 that the glue is applied in a manner similar to that which was applied on gasket member 40. The glue thus is applied to all the surfaces of gasket member 50 which eventually come in contact with the double side walls of the rearward severed portion of the cab body 30. Upon insertion of the gasket member 50 onto this rearward severed portion of cab 30 the glue is forced to spread and secure the gasket member 50 to the double side walls of the rearward severed portion of cab 30. Complimentary to the protrusion 49 appearing on gasket member 40 there appears on gasket member 50 a depression designated 59. The function of this depression 59 is to receive the protrusion 49 of gasket member 40. FIG. 5b is also a cross-section of gasket member 50 taken along a different section of gasket 50 in order to illustrate more clearly the overall construction of the gasket member 50. FIG. 5b also illustrates the depression 59 and the channels 58 as well as the side walls 57. Just as FIGS. 4a and 5a form a mating pair, it should be noted that FIGS. 4b and 5b form a mating pair in that protrusion 49 of gasket 40 fits into the depression 59 of gasket 50. When gasket member 40 and gasket member 50 are secured to their respective severed portions, the rearward severed portion of the roof and rearward severed portion of the cab are then capable of being removably rejoined, the male gasket 40 being matingly seated upon the gasket member 50.

The gasket member 60 and the gasket member 70 which serve to join the forward severed portion of the roof 20 to the forward severed portion of the cab 30 are of similar construction to the gasket members 40 and 50 described above. The general appearance of gasket member 60 is shown in FIG. 6. FIG. 8 shows that portion of the gasket 60 which contains the soft rubber insert designated 65.

FIG. 7 shows the general configuration of the gasket member 70 which fits over the severed forward portion of the roof 20. The details of the structure of gasket member 70 are more clearly illustrated in FIG. 9. FIGS. 8 and 9 thus illustrate the mating pair of gaskets 60 and 70. It should be noted that in both FIGS. 8 and 9 the double wall construction of the severed portions of both the roof and the cab are illustrated in phantom lines. The gasket member 60 also has a lip structure 62 comprised of a wall member 64 which in cooperation with the body portion 66 of gasket member 60 defines a channel 68. As in the case of the prior described gasket members glue is applied to the channel 68 and the side walls 67 such that when the gasket member 60 is placed in position on the forward severed portion of the cab body 30 the surfaces of the gasket member 60 which contact the double walls of the severed portion of the cab are covered with glue. This glue serves to secure the gasket member 60 in place on the forward severed portion of the cab 30. Gasket member 60 further is supplied with a depression 69 which is formed within a soft rubber insert 65 which runs the length of gasket member 60. The purpose of this soft rubber insert 65 is to form a tight sealing relationship with gasket member 70 and its protrusion 79. An additional purpose of this soft rubber insert is to provide a degree of springy compressive force which allows for a secure and snug fit of the overall roof with the cab body.

It is to be expressly understood that in place of the soft rubber insert 65, the entire gasket 60 can be made of relatively soft rubber and all the desired features of the insert will still be present. Gasket member 60 illustrated in FIG. 8 and gasket 70 illustrated in FIG. 9 form a mating pair.

Similar to the above described gasket member 60, gasket member 70 also has a lip structure 72 which is comprised of the wall member 74 and the channel 78. Channel 78 is defined by the relationship of wall 74 with the body 76 as described above with respect to the prior gasket members. Glue is spread on the walls 77 and in the channel 78 such that when gasket member 70 is fitted over the forward severed portion of the roof 20, those surfaces of gasket member 70 which come in contact with the double walls of the roof are coated with glue, and thereby retained in place on the severed portion. Gasket member 70 is also provided with a protrusion 79 which mates with the depression 69 of gasket member 60. A feature of gasket member 70 which is unique among the gasket members of the present invention is the provision at the end of protrusion 79 of a small lip structure defined by the ridge member 73. This ridge member 73 runs along the entire length of gasket member 70 at the end of protrusion 79. The purpose of this ridge 73 is to prevent any liquid which might find its way between seal members 60 and 70 so as to contact the protrusion 79 from finding its way around protrusion 79 and into the interior of the cab of the truck. Ridge 73 and wall 71 together with protrusion 79 define a channel which directs any water which may find its way in between gasket members 60 and 70 along the channel 75 toward either end of gasket member 70 where the fluid is allowed to drain off the end of channel 75 to the exterior of the cab.

Having thus described the various elements utilized in the present invention, the procedure to be followed in utilizing these elements will now be described with respect to FIGS. 1, 2, 3, 10 and 11.

FIG. 1 shows a cab section of a typical pickup truck. On this cab section have been placed scribing lines 12, 13 and 14. These scribing lines are precisely located on the cab by use of preformed fiberglass or polyurethane molds. These molds have been shaped to conform to the contours of the cab at specific locations such that when the form is properly seated on the cab one edge of the form precisely locates the position of the scribing line. Thus for each scribing line a separate mold must be used. In addition, for each different model of pickup truck different scribing molds must be preformed. Once the preformed scribing molds have been precisely seated on the cab of the pickup truck the scribing lines are scribed onto the body of the pickup truck. A mold is positioned on the exterior of the cab such that one edge of the mold locates a scribing line approximately three inches above the front window. An additional mold is similarly fitted on the interior of the cab to similarly locate a second scribing line on the interior of the cab also approximately three inches above the front window. A third scribing mold is seated on the exterior of the rear of the cab so that one edge of the scribing mold precisely locates the scribing line 14 at approximately three inches below the rear window. Similarly a fourth scribing mold is positioned on the interior of the cab so as to similarly precisely locate a scribing line 13 at approximately three inches below the rear window on the interior of the cab. By use of these scribing molds such scribing lines can be precisely located relative to the structure of the cab from one truck to the next on a production line basis with a high degree of uniformity. Such uniformity is necessary to insure that the gasket members 40, 50, 60 and 70 will properly fit in their respective locations on each truck.

When these four scribing lines have been scribed onto the surface of the cab an incision is made along each scribing line so as to sever the roof portion 20 from the cab body 30 as shown in FIG. 2. This results in the formation of a forward severed portion 22 and a rearward severed portion 24 of the roof member 20 and similarly results in the formation of a forward severed portion 26 and a rearward severed portion 28 also shown in FIG. 2. Since the gasket members 40, 50, 60 and 70 have a finite thickness, additional material must be trimmed along each of the severed sections of the roof portion in order to allow room for the insertion of these gasket members. Since the thickness of each gasket member at the point where it laps over the severed portion is approximately ¼ inch and since two such gaskets will be inserted to rejoin the roof to the cab at each severed section, it is necessary to trim ½ inch off each severed portion 20 and 24 of the roof 20. Once this ½ inch trim has been completed along severed portion 22 and severed portion 24, a filler foam material is then injected into all cavities of the roof portion 20 and the cab portion 30 which have been exposed by cutting along the scribed lines as shown in FIG. 2. The foam is injected into the cavities until it fills the cavity to within approximately two inches from the top of the cavity. The purpose of this filler foam is merely to occupy the space of the cavity and its function will be more clearly illustrated shortly.

At this point in order to form a secure base to which to anchor the latches which eventually will secure the roof to the cab a number of steel plates approximately two inches by three inches are installed at eight designated locations behind the interior wall of the roof member and behind the interior walls of the cab member. Two places each are installed behind the interior wall of the severed portion 22 of the roof member and behind the interior wall of the severed portion 24 of the roof member. Corresponding to these four locations two plates are also installed behind the interior wall of the cab at the forward severed section 26 and two plates are installed behind the interior wall of the rearward severed section 28 of cab 30. Each of these steel plates will serve to anchor ½ of a latch member, thus the roof will eventually be secured to the cab by four latches. Each of these steel plates is secured behind its respective wall by means of a bonding agent and the latch members will further be held in place by the screws which secure the latch member to the steel plate. Once these eight steel plates have been secured in position the four gasket members 40, 50, 60 and 70 are prepared for insertion upon their respective severed portions.

A bonding agent is applied to all surfaces of each gasket member which will eventually come in contact with a wall of the severed portions. In addition the lip structure of each gasket member is coated with bonding agent. Once each gasket member has been properly coated with the bonding agent the gasket members are placed in position over the metal edges defining their respective severed portions and are tapped into place. More specifically, gasket member 40 is tapped into place over the rearward severed portion 24 of the roof 20 and gasket member 70 is tapped into place over the severed portion 22 of the roof 20. Gasket member 50 is tapped into place over the severed edges of the severed portion 28 of the cab 30 and gasket member 60 is tapped into place over the severed portion 26 of the cab member 30. In order to insure a proper fit and proper alignment of the gasket members which are tapped into place on the roof section with the gasket members which are tapped into place on the cab section, the roof section is now mounted onto the cab section by insertion of the gasket member 70 into gasket member 60 and insertion of gasket member 40 into gasket member 50. At this point any adjustments which must be made to insure a proper fit and proper alignment may be made.

Once proper alignment of the roof section to the cab section is made, and with the roof section still joined to the cab section, holes are drilled into the eight steel backing plates described above and the locking latches are installed with self setting screws through the walls of the cab and the roof and into the steel plates thereby further securing the steel plate to the wall members of the cab and the roof. Once all of the latches have been properly mounted on the roof and on the cab the latches are locked into place thereby completely securing the roof section to the cab section.

At this point reference should be made to FIGS. 10 and 11 to illustrate the final step. With the roof now firmly secured in place to the cab by means of the latches a plurality of holes 90 as shown in FIG. 11 are drilled so as to penetrate the interior wall of the roof and the cab at a point adjacent each of the steel plates and further at a point between the gasket and the top of the filler foam such as illustrated in FIG. 11. Into this hole is injected by means of a pressure gun a mixture of quick setting glue and foam. The quick setting glue and foam permanently bonds the gaskets to the cab and also increases the strength of the cab structure considerably such that the overall structural integrity of this removable top structure meets the requirements of the manufacturer of the truck. The injected glue and foam thus fills the cavity between the filler foam previously injected into the cavity and the gaskets which have been tapped into place.

As can be seen by following this method the gaskets themselves project over all cuts which have been made on the body of the cab and the roof and there are no screws used in securing the gaskets to the body or the roof of the truck. Thus all cuts are concealed by the gaskets' lip structure and there is no stress applied to the severed portions of the cab or the roof and thus no paint is caused to chip because of any warpage resulting from the tightening of screws which have been used in the past to secure gaskets to the severed portions of the roof or the body. This method further allows the original top of the vehicle to be used in providing a removable top and thus the strength and integrity of the steel which forms the original top is retained.

This method allows the use of mating gaskets which can easily and quickly can be installed on the severed edges of the body and the roof with minimal modifications to the body and roof. In addition by use of the scribing molds a standardized gasket can be formed which can be used to apply the above described process to any truck of any particular model. The process defined above can be applied to any model truck provided that the scribing molds and gaskets have been preformed and standardized for that particular model. By means of the structure of the various gaskets there has also been provided a method for preventing liquids from traveling from the exterior of the cab to the interior of the cab.

It is to be understood that the above description is merely a description of the preferred embodiment of the device and process of the present invention. Many modifications and changes can be made to the specific devices shown and the specific process disclosed without departing from the spirit and scope of this invention, and it is to be understood that the present invention is not to be limited to the specific disclosure herein, but rather is intended to be limited only by the scope of the appended claims.

I claim:

1. A method for converting a hardtop vehicle to a removable hardtop vehicle comprising the steps of:
   (a) severing a predetermined portion of the roof of a vehicle from the body of the vehicle thereby exposing the cavity between the inner and outer walls of said roof and vehicle;
   (b) providing the severed portion of the roof and the body portion of the vehicle with joining means for removably rejoining said severed portion to said body portion said joining means having lip portions to conceal the edges of said severed portions and of said vehicle and further having a body portion extending into the cavity between the inner and outer walls of said roof and vehicle.

2. The method of claim 1 for converting a hardtop vehicle to a removable hardtop vehicle wherein step (a) includes the steps of:
   (i) scribing cutting lines on the body of the vehicle;
   (ii) cutting the body of the vehicle along said cutting lines.

3. The method of claim 2 for converting a hardtop vehicle to a removable hardtop vehicle wherein step (i) further includes the steps of:
   (i)(a) placement of scribing molds on the body of the vehicle; and
   (i)(b) temporarily securing said molds to the body of the vehicle.

4. The method of claim 1 for converting a hardtop vehicle to a removable hardtop vehicle wherein step (b) includes the steps of:
   (i) trimming away a portion of said roof so as to make room for said joining means;
   (ii) applying a bonding agent to said joining means; and
   (iii) securing said joining means to said roof portion and said body.

5. A method for converting a hardtop vehicle to a removable hardtop vehicle utilizing two pairs of mating gaskets, said method comprising the steps of:
   (a) placing and seating preformed scribing molds onto the body of the vehicle;
   (b) scribing cutting lines onto said vehicle along an edge of said scribing molds;
   (c) cutting said vehicle along said cutting lines thereby severing the roof of the vehicle from the body of said vehicle;
   (d) trimming away a portion of said roof along said cutting lines so as to make room for said two pairs of mating gaskets;
   (e) partially filling with a foam material the cavities in said roof and body which have been exposed by said cutting;
   (f) applying a bonding agent to the two pairs of mating gaskets;
   (g) placing and securing said two pairs of mating gaskets onto the severed edges of said roof and body;
   (h) replacing said roof portion onto said body portion;
   (i) providing a plurality of holes in the body and roof of said vehicle between the gaskets and said foam material;
   (j) injecting through said holes into the space between said gaskets and foam material a quick hardening bonding agent and foam to permanently bond said gaskets to said vehicle.

* * * * *